UNITED STATES PATENT OFFICE.

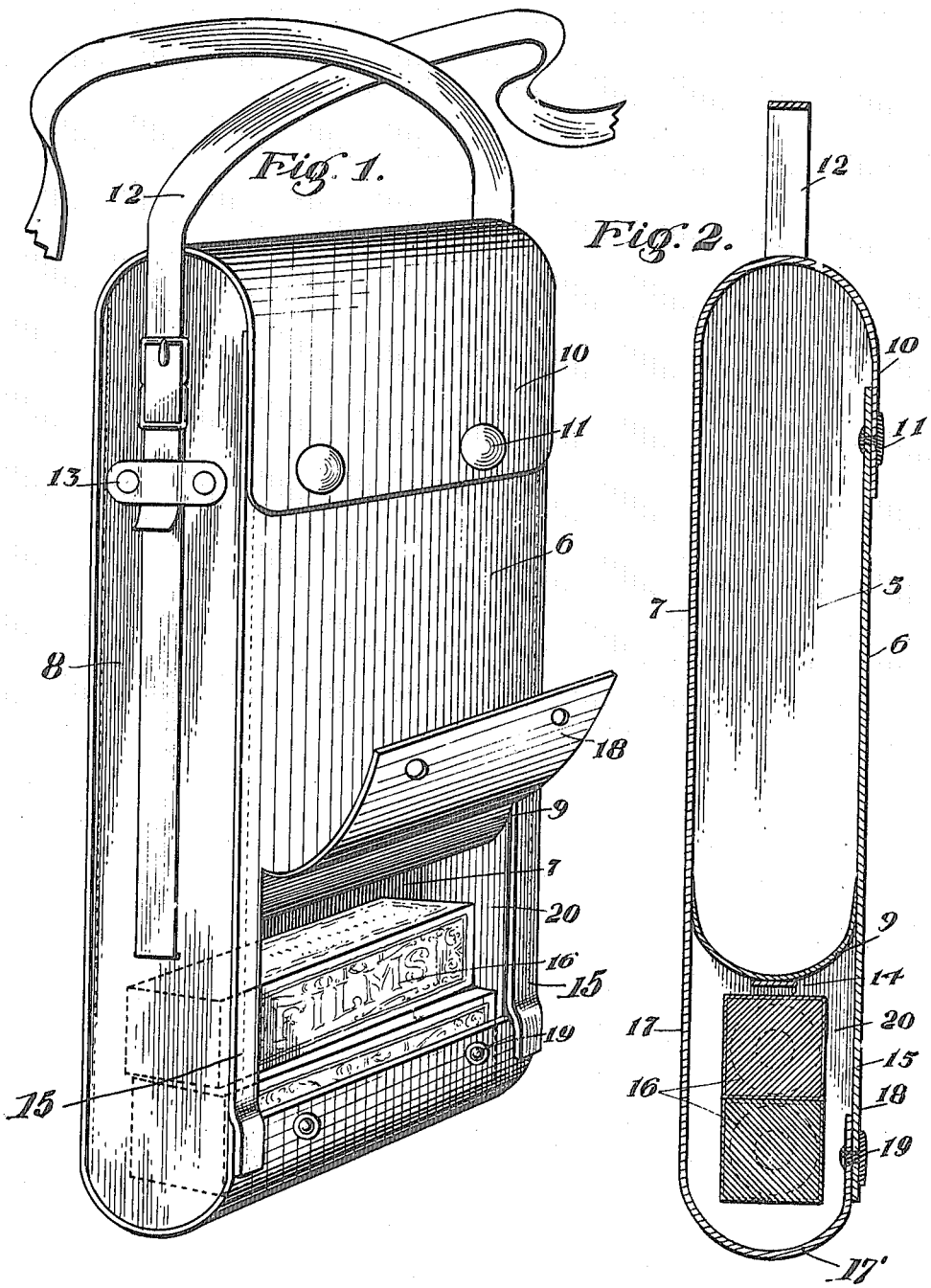

NORMAN B. CONWAY, OF YUMA, ARIZONA.

COMBINATION CAMERA AND FILM CARRYING CASE.

1,220,957.　　　　　Specification of Letters Patent.　　Patented Mar. 27, 1917.

Application filed June 21, 1916.　Serial No. 105,009.

*To all whom it may concern:*

Be it known that I, NORMAN B. CONWAY, a citizen of the United States, residing at Yuma, in the county of Yuma and State of Arizona, have invented new and useful Improvements in Combination Camera and Film Carrying Cases, of which the following is a specification.

This invention relates to a camera case, and particularly pertains to a case adapted to receive a camera and a supply of films therefor.

It is an object of this invention to provide a case for a folding camera of the roll film type and to also provide a suitable carrying compartment for extra film rolls for use with the incased camera.

Another object of this invention is to provide a combined camera and film case which will not differ greatly in shape nor size from film cases in present use and will provide ready access to either the camera or film compartment, without interfering with the other.

Another object of this invention is to provide a supporting member for the case which will securely carry the weight of the camera without danger of weakening due to the added film compartment.

A further object is to provide a combination camera and film case which may be simply made without material added expense over that of the cases now in use.

Further objects will appear hereinafter.

Figure 1 is a view in perspective illustrating the camera case and showing it with the film compartment open.

Fig. 2 is a view in vertical section taken transversely of the camera case.

Referring particularly to the drawings, 5 indicates a camera compartment which is formed with a front wall 6 and a rear wall 7. The walls 6 and 7 are connected at their ends by side walls 8. A separate arcuate partition wall 9, suitably secured to the front and rear walls 6 and 7, constitutes the bottom of the camera compartment 5. The front wall 6 terminates a short distance from the uppermost edge of the camera compartment and is overlapped by an upwardly opening closure flap 10, which is an extension of the rear wall 7 and is detachably secured adjacent the marginal edge of the wall 6 by means of suitable snap fasteners 11. The walls of the compartment are preferably constructed of leather and are stitched together along adjacent edges. As a means for carrying a case, a strap 12 is provided and led through binding straps 13 beneath the bottom 9 of the camera compartment, as indicated at 14, thus supporting the weight of the camera as it rests upon the bottom portion 9.

Immediately below the camera compartment 5, a film compartment 20 is provided which is formed by the downward extensions of the side walls 8 and downward extension 17 of the rear wall 7 whose lower end is bent to form an arcuate bottom 17' of the film case 20. The front end of the bottom 17' is secured to the lower end of the extension 15 of the front wall 6, said extension 15 forming the front wall of the film compartment 20. An upwardly opening closure flap 18, formed integral with the extension 15, is detachably secured to the marginal front edge of the bottom 17' by means of snap fasteners 19. In the drawings two rolls are shown in the film compartment, as this number is usually a sufficient supply for an ordinary requirement.

The operation and use of the device is evident as the closure member 10 is unsnapped to provide a suitable opening for the admittance of a camera to the compartment 5. The closure member 18 may be opened to allow rolls of films to be deposited within the film compartment 20, after which the member 18 may be held in a closed position by the fasteners 19.

It will thus be seen that I have here provided a simple and convenient combination camera and film case which may be easily operated to remove or fill either compartment without interference from the other of said compartments.

I claim:

1. A combination camera and film case comprising vertically disposed side wall members, end wall members adapted to connect said side wall members, a bottom provided at the lower terminating edge of said members, a flap closure provided for the upper open end formed by said walls, a partition wall secured across the interior of the compartment formed by the walls whereby a camera compartment will be formed and a film compartment provided therebelow, a carrying strap adapted to pass beneath and support said partition wall, a film compartment closure, and means whereby said upper flap closure and the film compartment closure may be detachably secured in their closed position.

2. A combination camera and film case of uniform transverse cross section, comprising vertically disposed side wall members, end wall members adapted to connect said side wall members, a bottom provided at the lower terminating edge of said members, a flap closure provided for the upper open end, a partition wall secured across the interior of the compartment formed by the walls whereby a camera compartment will be formed and a film compartment provided therebelow, a film compartment flap closure, and means on one of said side wall members whereby said flap closures may be detachably secured in their closed position.

3. A combination camera and film case comprising vertically disposed side wall members, end wall members adapted to connect said side wall members, a bottom provided at the lower terminating edge of said members, a closure for the upper open end, a partition wall secured across the interior of the compartment formed by the walls whereby a camera compartment and a film compartment will be provided, said lower compartment being provided with an opening and closure therefor, both of said closures being formed integral with said wall members, and means on one of said side wall members for detachably securing said closures in their closed position.

4. A combination camera and film case comprising vertically disposed side wall members, end wall members adapted to connect said side wall members, a bottom provided at the lower terminating edge of said members, a partition wall secured across the interior of the compartment formed by said wall members whereby a camera compartment and a film compartment will be formed, each of said camera and film compartments being provided with openings, upwardly opening closures for said openings, and means on one of said side wall members for detachably securing said closures in their closed position.

In testimony whereof I have signed my name to this specification.

NORMAN B. CONWAY.